United States Patent [19]
Takenaka et al.

[11] Patent Number: 5,477,741
[45] Date of Patent: Dec. 26, 1995

[54] MOTION TRANSFORMING MECHANISM

[75] Inventors: Hiroyuki Takenaka; Katumi Mori; Tuyoshi Nachi; Tomohiro Kiriyama; Masanori Hirai, all of Gifu, Japan

[73] Assignee: Teijin Seiki Co., Ltd., Osaka, Japan

[21] Appl. No.: 198,594

[22] Filed: Feb. 18, 1994

[30] Foreign Application Priority Data

Feb. 24, 1993 [JP] Japan .................................. 5-033844

[51] Int. Cl.⁶ ............................ F16H 19/04; F16H 25/08
[52] U.S. Cl. ................. 74/116; 74/465; 310/80; 310/156
[58] Field of Search ........................ 74/116, 120, 121, 74/122, 422, 89, 465; 475/168, 178; 310/67 R, 80, 90, 156

[56] References Cited

U.S. PATENT DOCUMENTS

| | | | |
|---|---|---|---|
| 3,974,406 | 8/1976 | Wehde | 310/67 R |
| 4,404,504 | 9/1983 | Giel . | |
| 5,061,868 | 10/1991 | Iwazaki et al. | 310/67 R X |
| 5,187,994 | 2/1993 | Hirai et al. | 74/120 |
| 5,351,572 | 10/1994 | Vortmeyer | 74/493 X |

FOREIGN PATENT DOCUMENTS

| | | |
|---|---|---|
| 482827 | 4/1992 | European Pat. Off. . |
| 437101 | 11/1926 | Germany .................. 74/422 |
| 2054794 | 2/1981 | United Kingdom . |

*Primary Examiner*—Rodney H. Bonck
*Assistant Examiner*—Troy Grabow
*Attorney, Agent, or Firm*—Lane, Aitken & McCann

[57] ABSTRACT

A motion transforming mechanism comprises a plate assembly and a toothed rail. The plate assembly is constituted by at least three rotation plates having a common rotation axis and each having a plurality of teeth, the rotation plates being respectively formed with cranked through bores. The toothed rail is formed with a plurality of teeth held in mesh with the teeth of rotation plates. The motion transforming mechanism further comprises a drive motor assembly constituted by a rotor unit rotatably received in the cranked through bores and a stator unit accommodated in the rotor unit. The rotation plates are rotated with respect to their common rotation axis by the rotation of the rotor unit with respect to stator unit. The motion transforming mechanism thus constructed requires no external electric motor and accordingly is able to be more easily assembled with various systems.

34 Claims, 8 Drawing Sheets

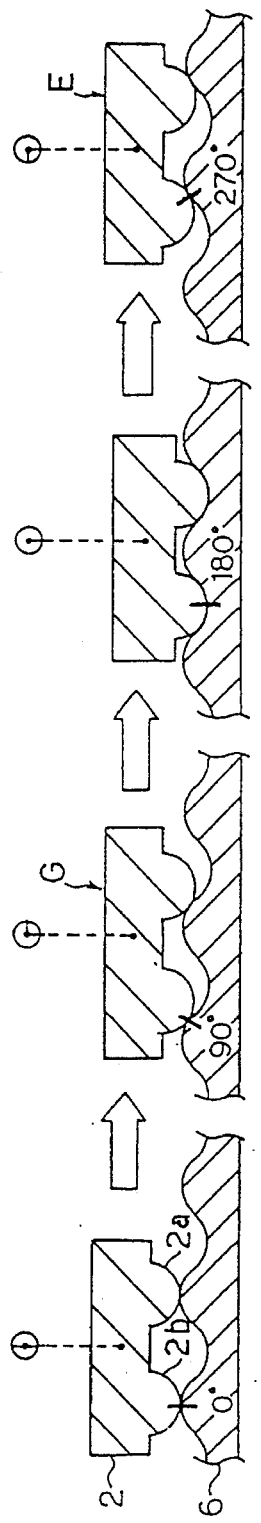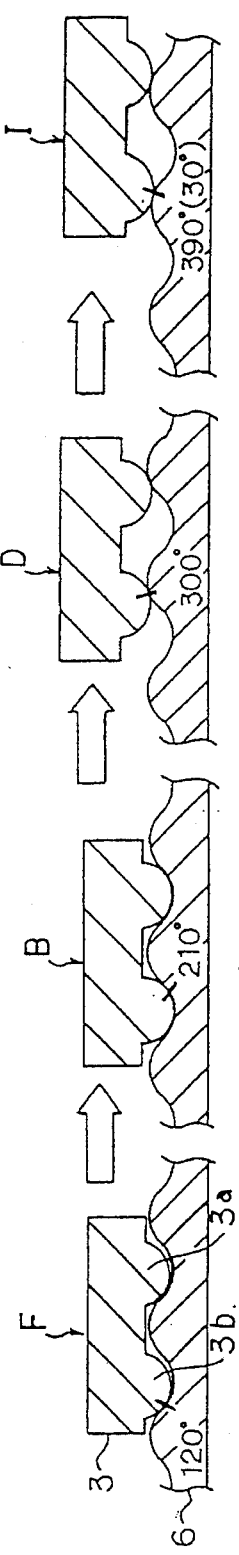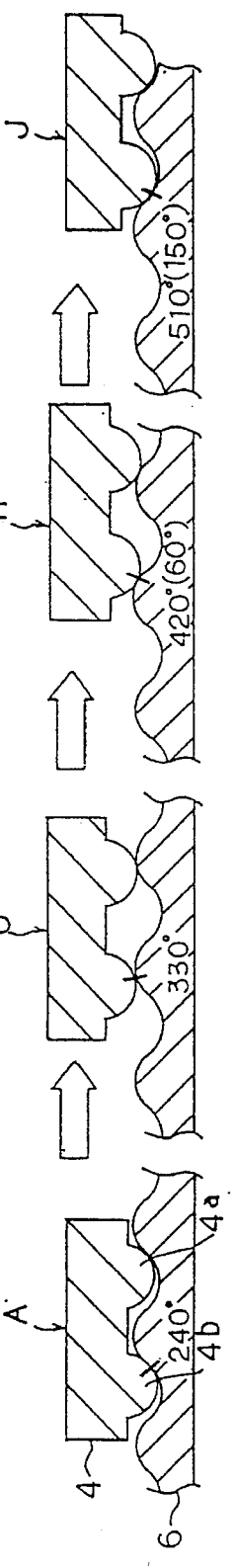

MOTION TRANSFORMING MECHANISM

FIELD OF THE INVENTION

The present invention relates to a motion transforming mechanism for transforming a rotational motion, for example, to a straight motion.

DESCRIPTION OF THE PRIOR ART

The motion transforming mechanism of this kind for transforming the rotation motion to the straight motion is utilized widely in the mechanical fields as a fundamental mechanical structure and for example is represented by a so-called rack-and-pinion structure consisting of a rack and a pinion held in mesh with each other. The rack-and-pinion structure is so constructed that the rotational motion of the pinion is transformed to the straight motion of the rack by way of a small number, for instance, "1" or "2" of teeth of the rack and the pinion meshing with one another. As a consequence, the rack and the pinion are inevitably required to become large in width in order to obtain a large thrust force for moving the rack with respect to the pinion. This results in such a drawback that the rack-and-pinion structure cannot avoid to become large in size.

In view of the foregoing drawback, there has so far been proposed by the present applicant a prior-art motion transforming mechanism disclosed in Japanese Patent Laid-open Publication No. 4-160258 and shown in FIGS. 7 and 8. FIG. 7 is a fragmentary schematic view showing an outline construction of the prior-art motion transforming mechanism and FIG. 8 is drawn for explaining the motion of the motion transforming mechanism. In FIGS. 7 and 8, the motion transforming mechanism comprises a first rotation shaft 1 driven by an electric motor not shown, three rotation plates 2 to 4 each formed with a plurality of teeth 2a–2b, 3a–3b and 4a–4b and rotatably supported by the first rotation shaft 1, a toothed straight rail 6 formed with a plurality of teeth 6a held in mesh with the teeth 2a–2b, 3a–3b and 4a–4b of the rotation plates 2 to 4 and a second rotation shaft 8 rotatably supporting the rotation plates 2 to 4 in cooperation with the first rotation shaft 1. As will be better seen from FIGS. 8(a), 8(b) and 8(c), the teeth 2a–2b, 3a–3b and 4a–4b of the rotation plates 2 to 4 are in the form of semicircular shape, while the teeth 6a of the toothed straight rail 6 are in the form of wave shape.

The first rotation shaft 1 is formed with three cranked shaft portions 1a to 1c having respective eccentric axes displaced from and arranged equi-angularly around the center axis of the first rotation shaft 1 so that the cranked shaft portions 1a to 1c are angularly displaced at 120 degrees of phase difference in FIGS. 7 and 8. The second rotation shaft 8 is formed with three cranked shaft portions 8a to 8c similar to those of the first rotation shaft 1. The rotation plates 2 to 4 have first cranked through bores 2c, 3c and 4c and second cranked through bores 2d, 3d and 4d which rotatably receive the cranked shaft portions 1a to 1c and 8a to 8c, respectively, and are accordingly rotated with respect to the center axis of the first rotation shaft 1 with 120 degrees of phase difference by the rotation of the first rotation shaft 1. In the construction as above, the input shaft is assumed to be rotated at angles of 0, 90, 180 and 270 degrees as shown in FIG. 8, whereupon the rotation plates 2–4, the teeth 2a–2b, 3a–3b and 4a–4b and the teeth of the toothed straight rail 6 are maintained in positional relationship to one another as follows.

The rotation plates 2 to 4 are thus provided with 120 degrees of phase difference angularly displaced to one another by means of the first and second cranked shaft portions 1a, 1b and 1c and 8a, 8b and 8c. This means that the rotation plates 3 and 4 are advanced at 120 and 240 degrees with respect to the rotation plate 2 when the rotation plate 2 is located at its predetermined position on the toothed rail 6. In other words, the teeth 2a–2b, 3a–3b and 4a–4b of the rotation plates 2 to 4 come to be held in meshing engagement with the teeth of the toothed straight rail 6 at a displaced angle of 120 degrees if the teeth of the toothed straight rail 6 have one pitch of 360 degrees.

When the teeth of one of rotation plates 2 to 4 are maintained in engagement with the ascending inclination surfaces of the teeth (see the alphabetical legends A–E), the teeth of at least one of the remaining two rotation plates are held in mesh with the descending inclination surfaces of the teeth (see the alphabetical legends F–J). Accordingly, the teeth of at least one of the rotation plates 2 to 4 are inevitably held in engagement with the descending inclination surfaces of the teeth of the toothed straight rail 6 during one revolution of the input shaft 1 so that the one of rotation plates can procure a thrust force needed for forcing the toothed straight rail 6 to be pushed depending upon the width and the number of the teeth of the rotation plate, thereby making it possible to realize a powerful intensive motion transforming mechanism for its small size.

A draw back inherent in a prior-art motion transforming mechanism is, however, still encountered in such an advanced version of the transforming mechanism in that the rotation shaft of the motion transforming mechanism is rotated by an external electric motor and as a consequence the arrangement of the external electric motor is required to be considered. This results in making it difficult to assemble the motion transforming mechanism with various systems.

The present invention contemplates provision of an improved motion transforming mechanism overcoming the drawback of the prior-art motion transforming mechanism of the described general natures.

SUMMARY OF THE INVENTION

According to one aspect of the present invention, there is provided a motion transforming mechanism, comprising a plate assembly constituted by at least three rotation plates having a common rotation axis and having respective rack portions each formed with a plurality of teeth, the rotation plates being laterally juxtaposed with one another in such a manner that the rack portions of the rotation plates are adjacent to one another, the rotation plates being respectively formed with cranked through bores having respective center axes in parallel relationship to one another and to the common rotation axis, the center axes of the cranked through bores being displaced from and arranged equi-angularly around the common rotation axis of the rotation plates, a toothed rail having a mid-longitudinal plane perpendicularly intersected by the common rotation axis of the rotation plates and extending along the mid-longitudinal plane, the toothed rail being formed with a plurality of teeth held in mesh with the teeth of each of rotation plates of the plate assembly, and a drive motor assembly constituted by a rotor unit and a stator unit, the rotor unit including a rotation shaft member formed with an axial through bore having a center axis coincident with the common rotation axis of the rotation plates and a plurality of permanent magnets securely mounted on the rotation shaft member in circumferentially spaced-apart relationship with one another, the rotation shaft member being formed with at least three cranked shaft portions having respective eccentric axes in parallel relationship to one another and to the center axis of the axial through bore, the eccentric axes of the cranked shaft portions being displaced from and arranged equi-angularly around the center axis of the axial through bore, and the cranked shaft portions being rotatably received in the cranked through bores of the rotation plates, respectively, and the stator unit including a fixed shaft member accommodated in the rotation shaft member in a manner having an annular gap formed between the inner surface of the rotation shaft member and the peripheral surface of the fixed shaft member and having its center axis coincident with the center axis of the axial through bore of the rotation shaft member, and a plurality of electromagnets securely mounted on the fixed shaft member in circumferentially spaced-apart relationship to one another and facing in the annular gap to the permanent magnets mounted on the rotation shaft member, the rotation plates being rotated with respect to their common rotation axis by the rotation of the rotation shaft member with respect to the fixed shaft member.

BRIEF DESCRIPTION OF THE DRAWINGS

The features and advantages of a motion transforming mechanism in accordance with the present invention will be more clearly understood from the following description taken in conjunction with the accompanying drawings in which:

FIGS. 8(a), (b) and (c) are fragmentary views for explaining the relative motion between each of rotation plates and a toothed straight rail shown in FIG. 7.

DESCRIPTION OF THE PREFERRED EMBODIMENTS

Referring to FIGS. 1 to 5 of the drawings, a first preferable embodiment of a motion transforming mechanism embodying the present invention is shown as comprising a plate assembly 11 constituted by at least three rotation plates 12 to 14 which have a common rotation axis RA and have respective rack portions each formed with a plurality of teeth 12a, 13a and 14a. The rotation plates 12 to 14 are laterally juxtaposed with one another in such a manner that the teeth 12a, 13a and 14a of the rack portions of the rotation plates 12 to 14 are adjacent to one another. As will be best seen from FIG. 4, the rotation plates 12 to 14 are respectively formed with cranked through bores 12b, 13b and 14b having respective center axes CA12b, CA13b and CA14b in parallel relationship to one another and to the common rotation axis RA, the center axes CA12b, CA13b and CA14b of the cranked through bores 12b, 13b and 14b being displaced from and arranged equi-angularly around the common rotation axis RA of the rotation plates 12 to 14. The arrangement of the center axes CA12b, CA13b and CA14b means that the cranked through bores 12b, 13b and 14b are angularly displaced at 120 degrees of phase difference because of the fact that the plate assembly 11 is composed of three rotation plates in the present embodiment.

Figure 1:
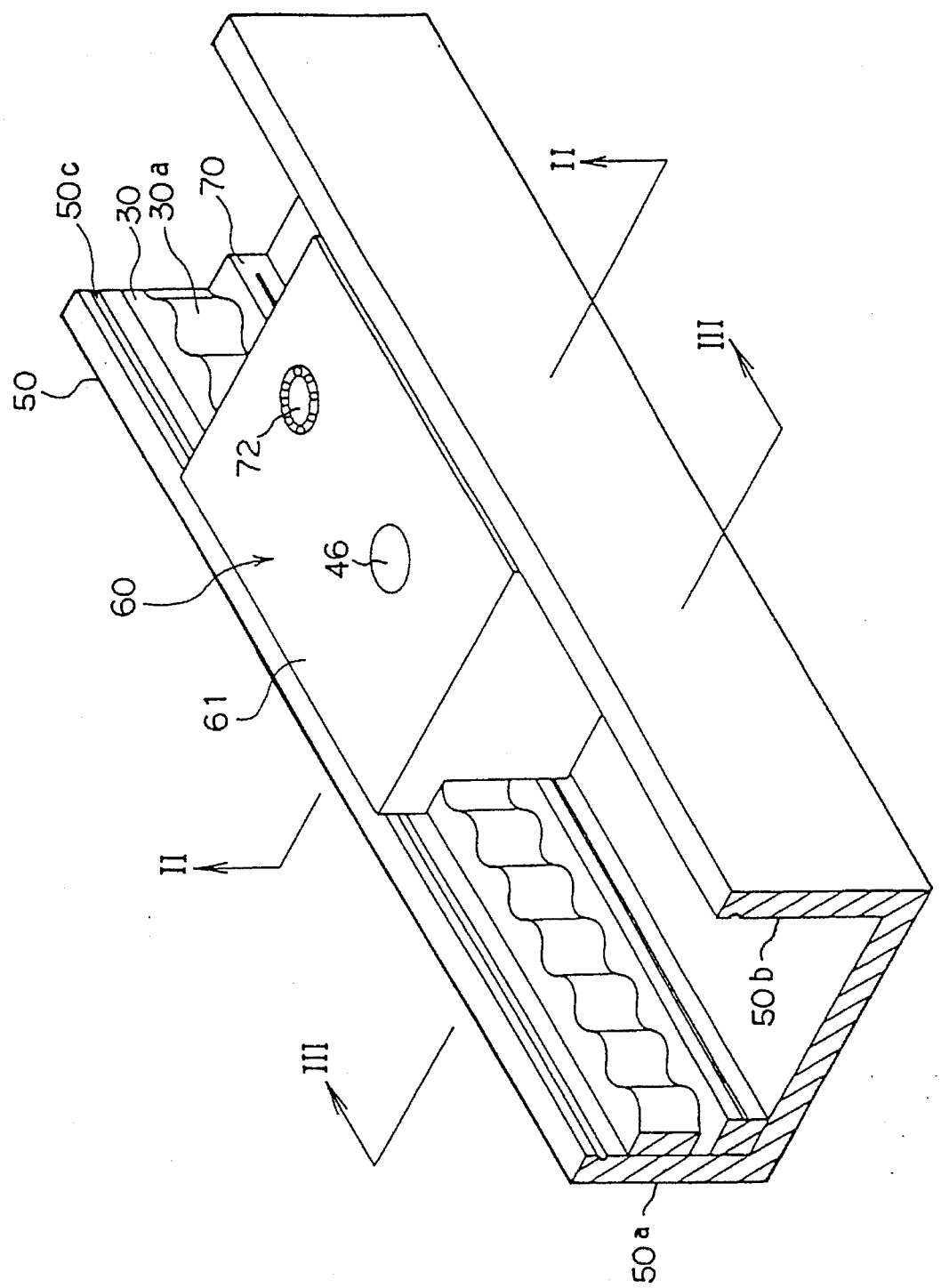
FIG. 1 is a perspective view of a first embodiment of the motion transforming/mechanism according to the present invention.
Figure 2:
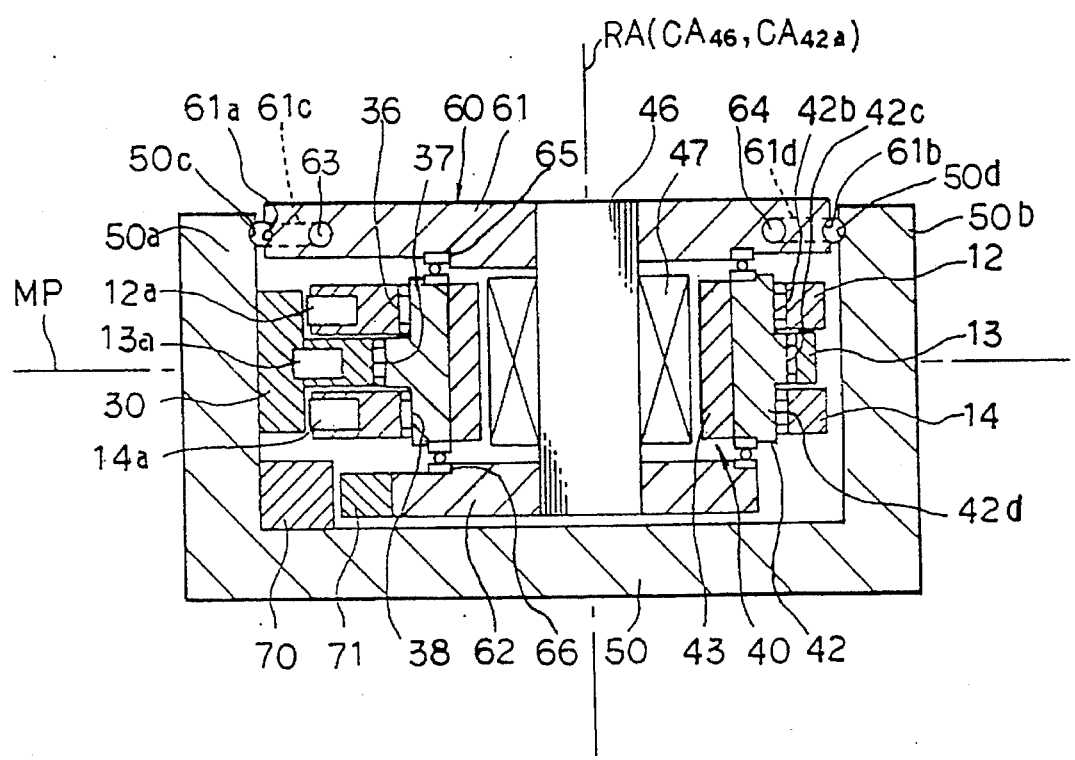
FIG. 2 is a cross-sectional view taken along the line II—II in FIG. 1.
Figure 3:
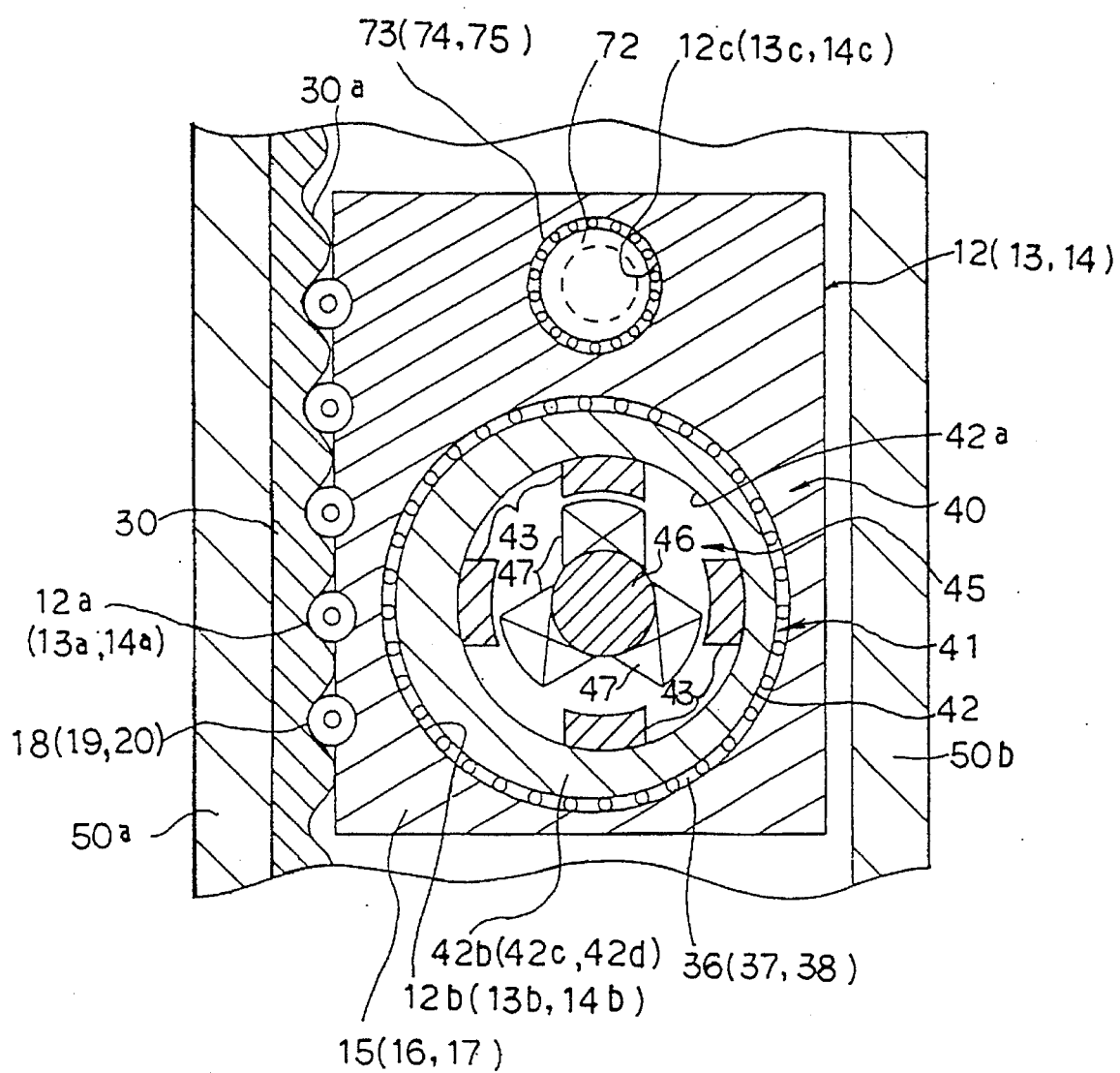
FIG. 3 is a cross-sectional view taken along the line III—III in FIG. 1.
Figure 4:
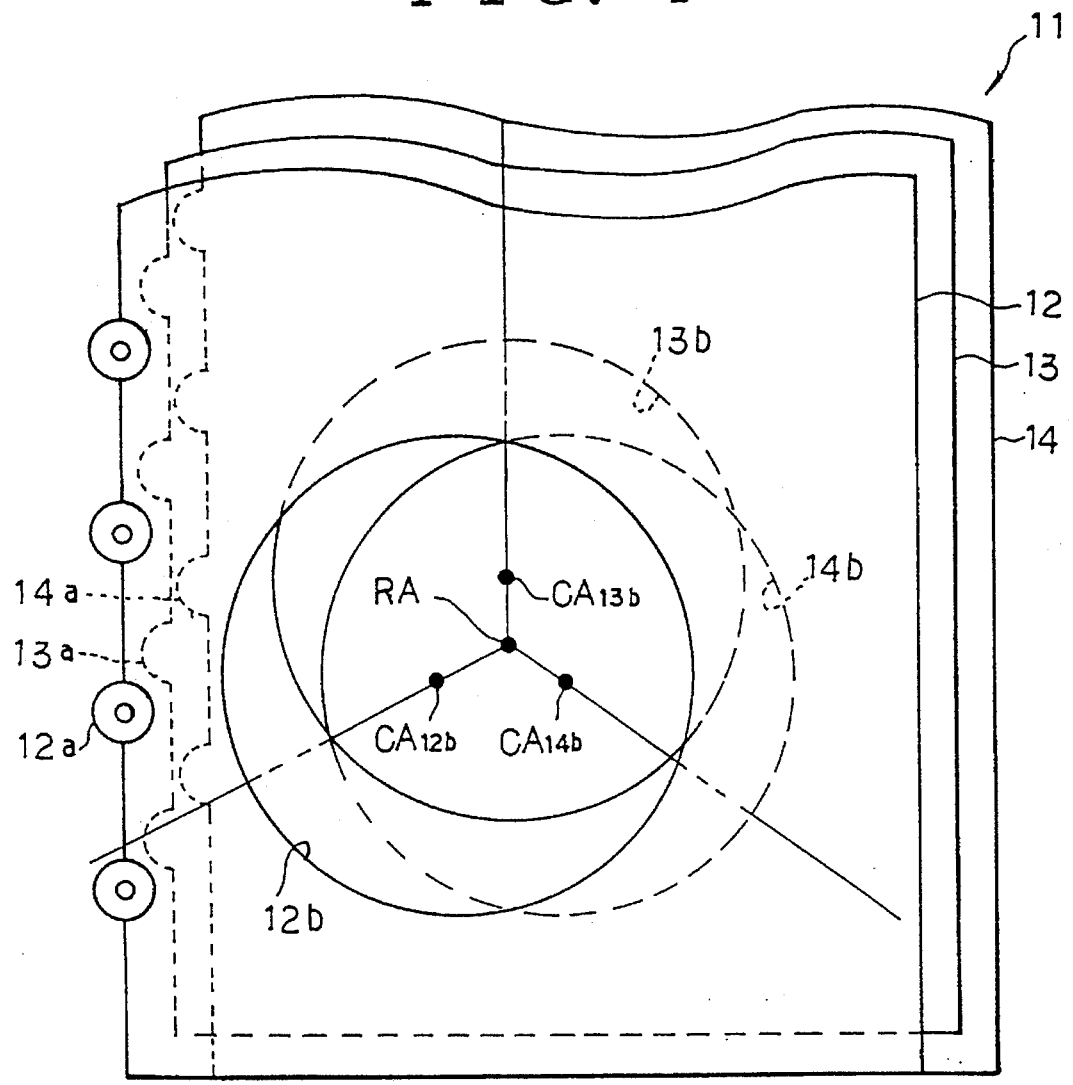
FIG. 4 is a plan view of a plate assembly partly constituting the motion transforming mechanism shown in FIG. 1.
Figure 5:
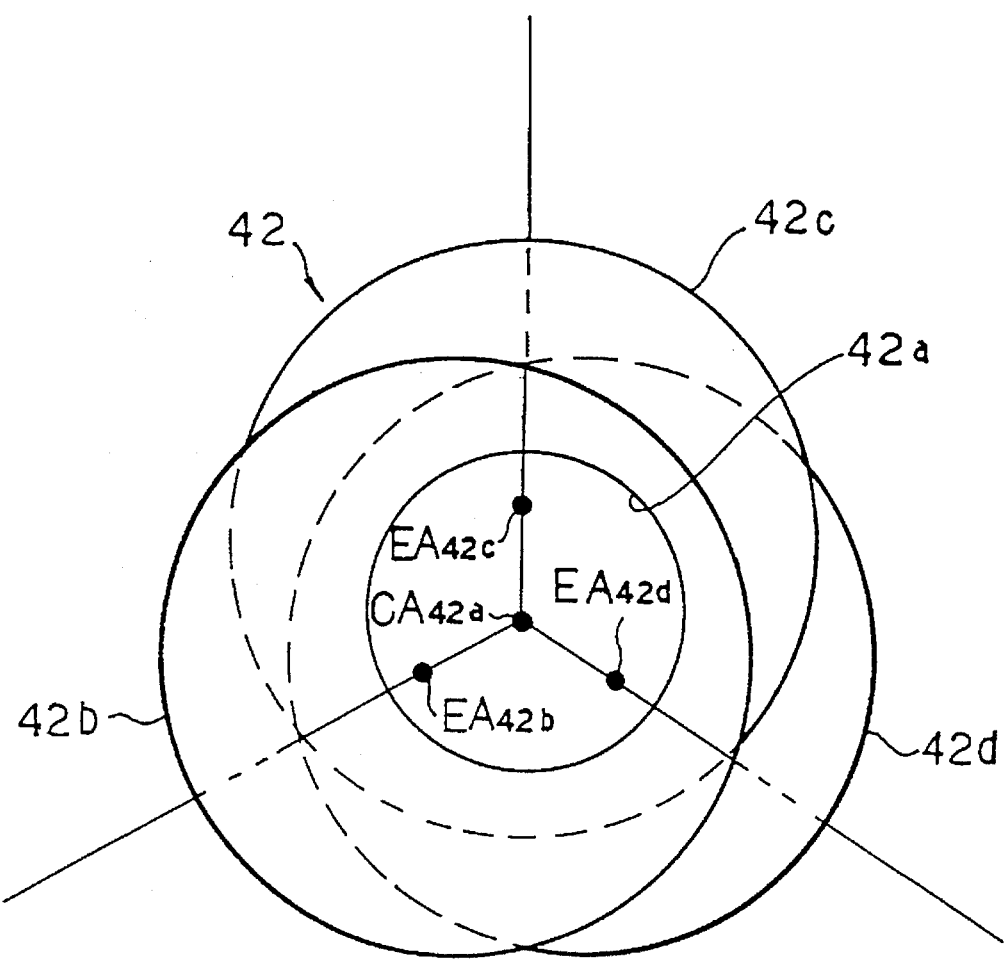
FIG. 5 is a plan view of a rotation shaft member partly forming the motion transforming mechanism shown in FIG. 1.

The motion transforming mechanism further comprises a toothed rail 30 which has a mid-longitudinal plane MP perpendicularly intersected by the common rotation axis RA of the rotation plates 12 to 14 to extend straight along the mid-longitudinal plane MP as shown in FIG. 2. The toothed rail 30 is formed with a plurality of teeth 30a held in mesh with the teeth 12a, 13a and 14 of rotation plates 12 to 14 of the plate assembly 11. As will be better seen from FIG. 3, each of the teeth 12a, 13a or 14a of each of the rotation plates 12 to 14 has a semicircular configuration in cross-section taken along the mid-longitudinal plane MP of the toothed rail 30, while the teeth 30a of the toothed rail 30 have a wave configuration in cross-section taken along the mid-longitudinal plane MP of the toothed rail 30. The rotation plates 12 to 14 comprises plate members 15 to 17 and a plurality of cylindrical pins 18 to 20 rotatably supported by the plate members 15 to 17 to form the teeth 12a, 13a and 14a of the rotation plates 12 to 14, respectively. The teeth 30a of the toothed rail 30 are, on the other hand, in the form of a cycloidal tooth profile or a trochoidal tooth profile.

The motion transforming mechanism further comprises a drive motor assembly 40 constituted by a rotor unit 41 and a stator unit 45. The rotor unit 41 includes a rotation shaft member 42 formed with an axial through bore 42a having a center axis CA42a coincident with the common rotation axis RA of the rotation plates 12 to 14, and a plurality of permanent magnets 43 securely mounted on the rotation shaft member 42 in circumferentially spaced-apart relationship with one another. As will be understood from FIGS. 2 and 5, the rotation shaft member 42 is formed with at least three cranked shaft portions 42b, 42c and 42d having respective eccentric axes EA42b, EA42c and EA42d in parallel relationship to one another and to the center axis CA42a of the axial through bore 42a, the eccentric axes EA42b, EA42c and EA42d of the cranked shaft portions 42b, 42c and 42d being displaced from and arranged equi-angularly around the center axis CA42a of the axial through bore 42a. This results in the fact that the cranked shaft portions 42b, 42c and 42d of the rotation shaft member 42 are identical in arrangement of axes to the cranked through bores 12b, 13b and 14b of the rotation plates 12 to 14. The cranked shaft portions 42b, 42c and 42d of the rotation shaft member 42 are journaled in roller bearings 36, 37 and 38 received in the cranked through bores 12b, 13b and 14b of the rotation plates 12 to 14, respectively, thereby enabling the rotation shaft member 42 to smoothly rotate with respect to the rotation plates 12 to 14. The stator unit 45 includes a fixed shaft member 46 accommodated in rotation shaft member 42 in a manner having an annular gap formed between the inner surface of the rotation shaft member 42 and the peripheral surface of the fixed shaft member 46 and having its center axis CA46 coincident with the center axis CA42a of the axial through bore 42a of the rotation shaft member 42. The stator unit 45 further includes a plurality of electromagnets 47 securely mounted on the fixed shaft member 46 in circumferentially spaced-apart relationship to one another and facing in the annular gap to the permanent magnets 43 mounted on the rotation shaft member 42. The electromagnets 47 are electrically connected to and controlled by a control unit not shown. The rotation plates 12 to 14 are rotated with respect to their common rotation axis RA by the rotation shaft member 42 while the rotation shaft member 42 is rotated with respect to the fixed shaft member 46.

The motion transforming mechanism further comprises a rail support member 50 including a pair of side plate portions 50a and 50b extending along the toothed rail 30 and spaced apart from each other to have the plate assembly 11, the toothed rail 30 and the drive motor assembly 40 positioned therebetween. The toothed rail 30 is secured to the plate portion 50a of the rail support member 50. The side plate portions 50a and 50b have respective inner side surfaces facing to each other to have thereon respective guide grooves 50c and 50d extending along the toothed rail 30. The motion transforming mechanism further comprises a plate assembly casing 60 constituted by first and second cover plate members 61 and 62 which are provided between and extending in perpendicular relationship to the side plate portions 50a and 50b of the rail support member and axially spaced apart from each other, thereby causing the plate assembly casing 60 to cover the plate assembly 11 and the drive motor assembly 40 in cooperation with the plate portions 50a and 50b of the rail support member 50. The fixed shaft member 46 is secured at its axially opposite end portions to the first and second cover plate members 61 and 62, respectively. The first cover plate member 61 has side surface portions respectively opposite to the inner side surface of the plate portions 50a and 50b of the rail support member 50. The side surface portions of the first cover plate member 61 have guide grooves 61a and 61b formed thereon and guide passageways 61c and 61d formed therein to be open at and connected to the opposite ends of the guide grooves 61a and 61b, respectively. The guide groove 61a of the first cover plate member 61 extends along the toothed rail 30 in opposite relationship to the guide groove 50c of the side plate portion 50a of the rail support member 50, while the guide groove 61b of the first cover plate member 61 extends along the toothed rail 30 in opposite relationship to the guide groove 50d of the side plate portion 50b of the rail support member 50. The motion transforming mechanism further comprises a first thrust bearing 65 provided between one of the opposite end portions of the rotation shaft member 42 and the first cover plate member 61, and a second thrust bearing 66 provided between the other of the opposite end portions of the rotation shaft member 42 and the second cover plate member 62, thereby making it possible to regulate the axial motion of the rotation shaft member 42 with respect to the fixed shaft member 46 in its axial direction. The motion transforming mechanism further comprises a plurality of rollable balls 63 and 64. The rollable balls 63 are rollably received in the guide groove 50c of the side plate portion 50a of the rail support member 50 and in the guide groove 61a and the guide passageway 61c of the first cover plate member 61, while the rollable balls 64 are rollably received in the guide groove 50d of the side plate portion 50b of the rail support member 50 and in the guide groove 61b and the guide passageway 61d of the first cover plate member 61, thereby having the gap invariably regulated between each of the inner side surfaces of the rail support member 50 and each of the side surface portion of the first cover plate member 61 and having the distance invariably regulated between the fixed shaft member 46 and the toothed rail 30. As a result, the toothed rail 30 is smoothly moved with respect to the plate assembly 11 while the rollable balls 63 and 64 are circulated through the guide grooves 61a and 61b and the guide passageways 61c and 61d of the side surface portions of the first cover plate member 61.

The motion transforming mechanism further comprises a scale member 70 which extends along the toothed rail 30 and is fixed on the inner side surface of the plate portion 50a of the rail support member 50, and a position detecting sensor 71 which is secured to the second cover plate member 62 in face-to-face and spaced-apart relationship to the scale member 70 to detect the position of the plate assembly 11 with respect to the toothed rail 30. The scale member 70 and the position detecting sensor 71 collectively form a linear encoder, for example, of an optical type. The position detecting sensor 71 is electrically connected to the control unit controlling the electromagnets 47 so that the control unit can facilitate a feedback control in the position of the plate assembly 11. The motion transforming mechanism further comprises a rotation shaft 72 having a center axis perpendicularly intersecting the mid-longitudinal plane MP of the toothed rail 30 and rotatably supported by the plate assembly casing 60. Similarly to the rotation shaft member 42, the rotation shaft 72 is designed to be formed with at least three cranked shaft portions having respective eccentric axes in parallel relationship to one another and to the center axis of the rotation shaft 72, the eccentric axes of the cranked shaft portions being displaced from and arranged equi-angularly around the center axis of the rotation shaft 72. The rotation plates 12 to 14 of the plate assembly 11 are formed with additional cranked through bores 12c, 13c and 14c having center axes, respectively, in parallel relationship to one another and to the center axis of the rotation shaft 72, the center axes of the additional cranked through bores 12c, 13c and 14c being displaced from and arranged equi-angularly around the center axis of the rotation shaft 72. The cranked shaft portions of the rotation shaft 72 are rotatably received in the additional cranked through bores 12c, 13c and 14c of the rotation plates 12, 13 and 14 through roller bearings 73, 74 and 75, respectively.

According to the above mentioned structure of the motion transforming mechanism, the rotation shaft member 42 is rotated with respect to the fixed shaft member 46 if the electromagnets 47 is excited by the control unit not shown under the condition that the plate assembly casing 60 is kept at a standstill. The rotational motion of the rotation shaft member 42 causes not only the cranked shaft portions 42b, 42c and 42d but also the rotation plates 12 to 14 to be rotated at 120 degrees of phase difference with respect to the fixed shaft member 46. At this time, the teeth 30a of the toothed rail 30 are pressed and moved at all times by the teeth of at least one of the rotation plates 12 to 14, since the teeth 12a, 13a and 14a of the rotation plates 12 to 14 remain in face-to-face engagement with the teeth 30a of the toothed rail 30 at 120 degrees of phase difference angularly displaced to one another. The above-described pressing and moving actions of the rotation plates 12 to 14 are repeated by the rotation plates 12 to 14 one after another, thereby transforming the rotation motion of the rotation shaft member 42 into the straight motion between the plate assembly 11 and the toothed rail 30. While there has been described in the above embodiment about the fact that the plate assembly casing 60 is kept at a standstill, the toothed rail 30 may be kept at a standstill in accordance with the present invention.

As will be understood from the aforesaid description, the drive motor assembly 40 provided for driving the rotation plates 12 to 14 is accommodated in the cranked through bores 12b, 13b and 14b of the rotation plates 12 to 14, thereby rendering it possible to realize a motion transforming mechanism which requires no external electric motor and accordingly is able to be more easily assembled with various systems.

In the aforementioned first preferred embodiment of the mechanism according to the present invention, the toothed rail 30 is constituted by a straight member, however, the toothed rail 30 may be constituted by a curved member extending arcuately. In this instance, the rotation motion of the rotation shaft member 42 is transformed into the relative curvilinear motion between the toothed rail 30 and plate assembly 11. Additionally, the cylindrical pins 18 to 20 are rotatably supported by the plate members 15 to 17, respectively, in the first embodiment. If however desired, each of the cylindrical pins 18 to 20 may be partly embedded in and partly protruded from each of the plate members 15 to 17 to form each of the teeth 12a, 13a and 14a of the rotation plates 12 to 14. Furthermore, the toothed rail 30 is constituted only by a single piece of member in the first embodiment, however, the toothed rail 30 may be composed of a plurality of toothed parts divided laterally, the toothed parts having a half cycle of the tooth profile or its integer times and mutually connected for producing a necessary length of the toothed rail 30 because of the fact that it is extremely difficult to form such a precise waved surface as formed by a cycloidal tooth profile or a trochoidal tooth profile at the whole length of the toothed rail 30.

Figure 6:
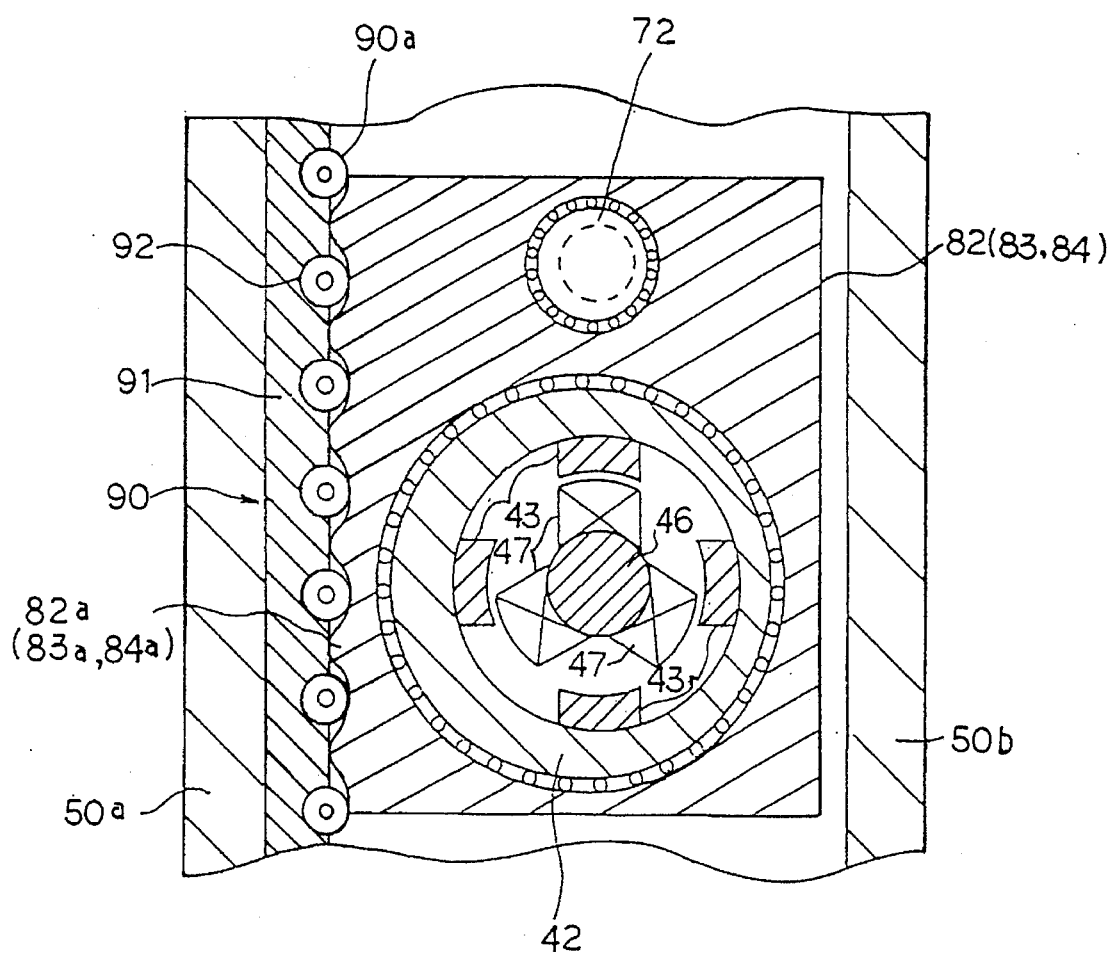
FIG. 6 is similar to FIG. 3 but shows a cross-sectional view of a second embodiment of the motion transforming mechanism according to the present invention.
Figure 7:
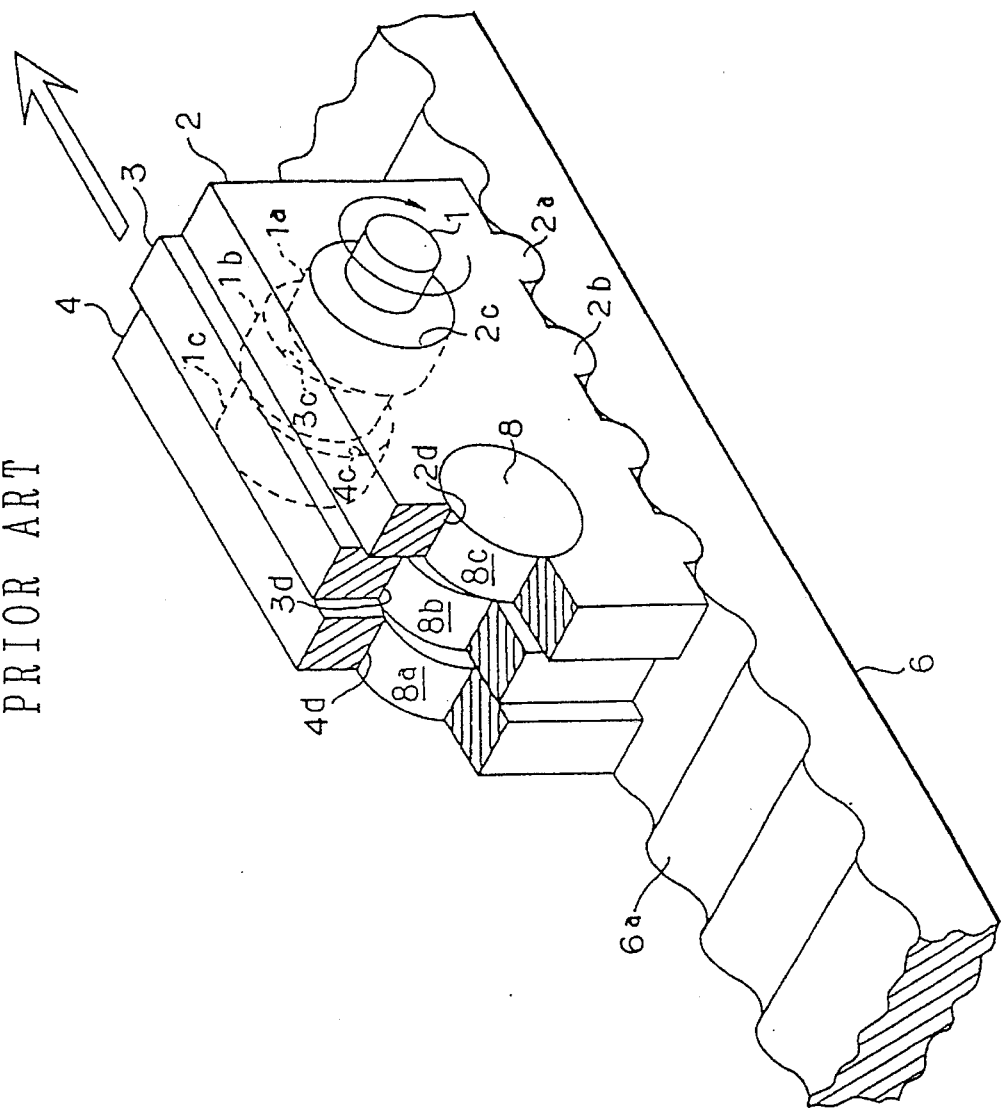
FIG. 7 is a perspective schematic view of a prior-art motion transforming mechanism.

FIG. 6 shows a second preferred embodiment of the motion transforming mechanism according to the present invention. The second embodiment of the motion transforming mechanism comprises rotation plates 82 to 84 and a toothed rail 90 which are different in construction from the rotation plates 12 to 14 and the toothed rail 30, respectively, of the first embodiment of the motion transforming mechanism as will be described hereinafter. The other elements or parts of the second embodiment of the motion transforming mechanism are entirely same as those of the first embodiment of the motion transforming mechanism and will accordingly be omitted for description for the sake of tedious repetition. As will be understood from FIG. 6, the rotation plates 82 to 84 is respectively formed with a plurality of teeth 82a, 83a, and 84a each having a wave configuration in cross-section taken along the mid-longitudinal plane of the toothed rail 90, while the toothed rail 90 is formed with a plurality of the teeth 90a each having a semicircular configuration in cross-section taken along the mid-longitudinal plane of the toothed rail 90. More specifically, the teeth 82a, 83a and 84a of the rotation plates 82 to 84 are in the form of a cycloidal tooth profile or a trochoidal tooth profile. The toothed rail 90 is, on the other hand, constituted by a rail member 91 and a plurality of cylindrical pins 92 rotatably supported by the rail member 91 or each partly embedded in and partly protruded from the rail member 91 to form the teeth 90a of the toothed rail 90.

It will be understood by those skilled in the art that the foregoing description is in terms of preferred embodiments of the present invention wherein various changes and modifications may be made without departing from the spirit and scope of the invention, as set forth in the appended claims.

What is claimed is:

1. A motion transforming mechanism, comprising;

a plate assembly constituted by at least three rotation plates having a common rotation axis and having respective rack portions each formed with a plurality of teeth, said rotation plates being laterally juxtaposed with one another in such a manner that said rack portions of said rotation plates are adjacent to one another, said rotation plates being respectively formed with cranked through bores having respective center axes in parallel relationship to one another and to said common rotation axis, the center axes of said cranked through bores being displaced from and arranged equiangularly around said common rotation axis of said rotation plates;

a toothed rail having a mid-longitudinal plane perpendicularly intersected by the common rotation axis of said rotation plates and extending along said mid-longitudinal plane, said toothed rail being formed with a plurality of teeth held in mesh with the teeth of each of rotation plates of said plate assembly;

a rail support member extending along said toothed rail to support said toothed rail;

a plate assembly casing including first and second cover plate members spaced apart from each other to cover said plate assembly and movable with respect to said rail support member;

a drive motor assembly constituted by a rotor unit and a stator unit, said rotor unit including a rotation shaft member formed with an axial through bore having a center axis coincident with said common rotation axis of said rotation plates and a plurality of permanent magnets securely mounted on said rotation shaft member in circumferentially spaced-apart relationship with one another, said rotation shaft member being formed with at least three cranked shaft portions having respective eccentric axes in parallel relationship to one another and to the center axis of said axial through bore, the eccentric axes of said cranked shaft portions being displaced from and arranged equi-angularly around the center axis of said axial through bore, and said cranked shaft portions being rotatably received in said cranked through bores of said rotation plates, respectively, and said stator unit including a fixed shaft member accommodated in the axial through bore of said rotation shaft member secured at its axially opposite end portions to said first and second cover plate members of said plate assembly casing in a manner having an annular gap formed between the inner surface of said rotation shaft member and the peripheral surface of said fixed shaft member and having its center axis coincident with the center axis of the axial through bore of said rotation shaft member, and a plurality of electromagnets securely mounted on said fixed shaft member in circumferentially spaced-apart relationship to one another and facing in said annular gap to said permanent magnets mounted on said rotation shaft member, said rotation plates being rotated with respect to their common rotation axis by the rotation of said rotation shaft member with respect to said fixed shaft member;

first guiding means for guiding said rotation shaft member and having said rotation shaft member rotatable with respect to said plate assembly casing and said fixed shaft member with said annular gap being formed between the inner surface of said rotation shaft member and the peripheral surface of said fixed shaft member and with the center axis being coincident with the center axis of the axial through bore of said rotation shaft member; said guiding means including a plurality of bearings each provided between said rotation shaft member and each of said first and second cover plate members; and second guiding means for guiding said plate assembly casing with respect to said rail support member with the gap invariably regulated between said plate assembly casing and said rail support member in a manner having the distance invariably regulated between said fixed shaft member and said toothed rail to facilitate the smooth relative motion of said toothed rail with respect to said plate assembly.

2. A motion transforming mechanism comprising:

a plate assembly constituted by at least three rotation plates having a common rotation axis and having respective rack portions each formed with a plurality of teeth, said rotation plates being laterally juxtaposed with one another in such a manner that said rack portions of said rotation plates are adjacent to one another, said rotation plates being respectively formed with cranked through bores having respective center axes in parallel relationship to one another and to said common rotation axis, the center axes of said cranked through bores being displaced from and arranged equi-angularly around said common rotation axis of said rotation plates;

a toothed rail having a mid-longitudinal plane perpendicularly intersected by the common rotation axis of said rotation plates and extending along said mid-longitudinal plane, said toothed rail being formed with a plurality of teeth held in mesh with the teeth of each of rotation plates of said plate assembly;

a rail support member including a pair of side plate portions extending along said toothed rail and spaced apart from each other to have said plate assembly, said toothed rail and said drive motor assembly positioned therebetween, said toothed rail being secured to one of said plate portions of said rail support member, said side plate portions having respective inner side surfaces facing to each other to have thereon respective guide grooves extending along said toothed rail;

a plate assembly casing including first and second cover plate members provided between and extending in perpendicular relationship to said side plate portions of said rail support member and axially spaced apart from each other to cover said plate assembly and said drive motor assembly in cooperation with said plate portions of said rail support member, said fixed shaft member being secured at its axially opposite end portions to said first and second cover plate members, respectively, said first cover plate member having side surface portions respectively opposite to said inner side surfaces of said plate portions of said rail support member, each of said side surface portions of said first cover plate member having a guide groove formed thereon and a guide passageway formed therein to be open at and connected to the opposite ends of said guide groove, each of said guide grooves of side surface portions extending along said toothed rail in opposite relationship to each of said guide grooves of side plate portions of said rail support member;

a drive motor assembly constituted by a rotor unit and a stator unit, said rotor unit including a rotation shaft member formed with an axial through bore having a center axis coincident with said common rotation axis of said rotation plates and a plurality of permanent magnets securely mounted on said rotation shaft member in circumferentially spaced-apart relationship with one another, said rotation shaft member being formed with at least three cranked shaft portions having respective eccentric axes in parallel relationship to one another and to the center axis of said axial through bore, the eccentric axes of said cranked shaft portions being displaced from and arrange equi-angularly around the center axis of said axial through bore, and said cranked shaft portions being rotatably received in said cranked through bores of said rotation plates, respectively and said stator unit including a fixed shaft member accommodated in the axial through bore of said rotation shaft member and secured at its axially opposite end portions to said first and second cover plate members of said plate assembly casing in a manner having an annular gap formed between the inner surface of said rotation shaft member and the peripheral surface of said fixed shaft member and having its center axis coincident with the center axis of the axial through bore of said rotation shaft member, and a plurality of electromagnets securely mounted on said fixed shaft member in circumferentially spaced-apart relationship to one another and facing in said annular gap to said permanent magnets mounted on said rotation shaft member, said rotation plates being rotated with respect to their common rotation axis by the rotation of said rotation shaft member with respect to said fixed shaft member;

first and second thrust bearings each provided between each of said opposite end portions of said rotation shaft member and each of said first and second cover plate members to regulate the axial motion of said rotation shaft member with respect to said fixed shaft member in its axial direction; and a plurality of rollable balls rollably received in said guide grooves of side plate portions of said rail support member and in said guide grooves and said guide passageways of said inner side surface portions of said first cover plate member in a manner having the gap invariably regulated between each of said inner side surfaces of said rail support member and each of said side surface portions of said first cover plate member and having the distance invariably regulated between said fixed shaft member and said toothed rail to facilitate the smooth relative motion of said toothed rail with respect to said plate assembly while said rollable balls being circulated through said guide grooves and said guide passageways of said side surface portions of said first cover plate member.

3. A motion transforming mechanism as set forth in claim 2, further comprising:

a scale member extending along said toothed rail and fixed on said rail support member; and a position detecting sensor secured to said second cover plate member in face-to-face and spaced-apart relationship to said scale member and detecting the position of said plate assembly with respect to said toothed rail to facilitate the position control of said plate assembly.

4. A motion transforming mechanism as set forth in claim 1, wherein said toothed rail extends straight.

5. A motion transforming mechanism as set forth in claim 1, wherein said toothed rail extends arcuately.

6. A motion transforming mechanism as set forth in claim 1, wherein each of said teeth of said rotation plates has a semicircular configuration in cross-section taken along said mid-longitudinal plane of said toothed rail and wherein said teeth of said toothed rail have a wave configuration in cross-section taken along said mid-longitudinal plane of said toothed rail.

7. A motion transforming mechanism as set forth in claim 6, wherein said toothed rail is composed of a plurality of toothed parts divided laterally.

8. A motion transforming mechanism as set forth in claim 6, wherein each of said rotation plates comprises a plate member and a plurality of rotation cylindrical pins rotatably supported by each of said plate members, each of said teeth of said rotation plates being formed by a semicircular portion of each of said rotation cylindrical pins facing to said toothed rail.

9. A motion transforming mechanism as set forth in claim 6, wherein each of said rotation plates comprises a plate member and a plurality of fixed cylindrical pins each partly embedded in and partly protruded form each of said plate members to form said teeth of said rotation plates.

10. A motion transforming mechanism as set forth in claim 6, wherein said teeth of said toothed rail are in the form of a cycloidal tooth profile.

11. A motion transforming mechanism as set forth in claim 6, wherein said teeth of said toothed rail are in the form of a trochoidal tooth profile.

12. A motion transforming mechanism as set forth in claim 1, wherein said teeth of said rotation plates have a wave configuration in cross-section taken along said mid-longitudinal plane of said toothed rail and wherein each of said teeth of said toothed rail has a semicircular configuration in cross-section taken along said mid-longitudinal plane of said toothed rail.

13. A motion transforming mechanism as set forth in claim 12, wherein said toothed rail comprises a rail member and a plurality of rotation cylindrical pins rotatably supported by said rail member, each of said teeth of said toothed rail being formed by a semicircular portion of each of said rotation cylindrical pins facing to said rotation plates.

14. A motion transforming mechanism as set forth in claim 12, wherein said toothed rail comprises a rail member and a plurality of fixed cylindrical pins each partly embedded in and partly protruded from said rail member to form said teeth of said toothed rail.

15. A motion transforming mechanism as set forth in claim 12, wherein said teeth of said rotation plates are in the form of a cycloidal tooth profile.

16. A motion transforming mechanism as set forth in claim 12, wherein said teeth of said rotation plates are in the form of a trochoidal tooth profile.

17. A motion transforming mechanism as set forth in claim 1, further comprising at least three roller bearings received in said cranked through bores of said rotation plates to allow said cranked shaft portions of said rotation shaft member to be journaled therein.

18. A motion transforming mechanism as set forth in claim 1, further comprising a rotation shaft having a center axis perpendicularly intersecting said mid-longitudinal plane of said toothed rail and formed with at least three cranked shaft portions having respective eccentric axes in parallel relationship to one another and to the center axis of said rotation shaft, the eccentric axes of said cranked shaft portions being displaced from and arranged equi-angularly around the center axis of said rotation shaft, wherein said rotation plates of said plate assembly are formed with additional cranked through bores having center axes, respectively, in parallel relationship to one another and to the center axis of said rotation shaft, the center axes of said additional cranked through bores being displaced from and arranged equi-angularly around the center axis of said rotation shaft, and said cranked shaft portions of said rotation shaft being rotatably received in said additional cranked through bores of said rotation plates, respectively.

19. A motion transforming mechanism as set forth in claim 1, further comprising:

a scale member extending along said toothed rail and fixed on said rail support member; and a position detecting sensor secured to said second cover plate member in face-to-face and spaced-apart relationship to said scale member and detecting the position of said plate assembly with respect to said toothed rail to facilitate the position control of said plate assembly.

20. A motion transforming mechanism as set forth in claim 2, wherein said toothed rail extends straight.

21. A motion transforming mechanism as set forth in claim 2, wherein said toothed rail extends arcuately.

22. A motion transforming mechanism as set forth in claim 2, wherein each of said teeth of said rotation plates has a semicircular configuration in cross-section taken along said mid-longitudinal plane of said toothed rail and wherein said teeth of said toothed rail have a wave configuration in cross-section taken along said mid-longitudinal plane of said toothed rail.

23. A motion transforming mechanism as set forth in claim 22, wherein said toothed rail is composed of a plurality of toothed parts divided laterally.

24. A motion transforming mechanism as set forth in claim 22, wherein each of said rotation plates comprises a plate member and a plurality of rotation cylindrical pins rotatably supported by each of said plate members, each of said teeth of said rotation plates being formed by a semicircular portion of each of said rotation cylindrical pins facing to said toothed rail.

25. A motion transforming mechanism as set forth in claim 22, wherein each of said rotation plates comprises a plate member and a plurality of fixed cylindrical pins each partly embedded in and partly protruded form each of said plate members to form said teeth of said rotation plates.

26. A motion transforming mechanism as set forth in claim 22, wherein said teeth of said toothed rail are in the form of a cycloidal tooth profile.

27. A motion transforming mechanism as set forth in claim 22, wherein said teeth of said toothed rail are in the form of a trochoidal tooth profile.

28. A motion transforming mechanism as set forth in claim 2, wherein said teeth of said rotation plates have a wave configuration in cross-section taken along said mid-longitudinal plane of said toothed rail and wherein each of said teeth of said toothed rail has a semicircular configuration in cross-section taken along said mid-longitudinal plane of said toothed rail.

29. A motion transforming mechanism as set forth in claim 28, wherein said toothed rail comprises a rail member and a plurality of rotation cylindrical pins rotatably supported by said rail member, each of said teeth of said toothed rail being formed by a semicircular portion of each of said rotation cylindrical pins facing to said rotation plates.

30. A motion transforming mechanism as set forth in claim 28, wherein said toothed rail comprises a rail member and a plurality of fixed cylindrical pins each partly embedded in and partly protruded from said rail member to form said teeth of said toothed rail.

31. A motion transforming mechanism as set forth in claim 28, wherein said teeth of said rotation plates are in the form of a cycloidal tooth profile.

32. A motion transforming mechanism as set forth in claim 28, wherein said teeth of said rotation plates are in the form of a trochoidal tooth profile.

33. A motion transforming mechanism as set forth in claim 2, further comprising at least three roller bearings received in said cranked through bores of said rotation plates to allow said cranked shaft portions of said rotation shaft member to be journaled therein.

34. A motion transforming mechanism as set forth in claim 2, further comprising a rotation shaft having a center axis perpendicularly intersecting said mid-longitudinal plane of said toothed rail and formed with at least three cranked shaft portions having respective eccentric axes in parallel relationship to one another and to the center axis of said rotation shaft, the eccentric axes of said cranked shaft portions being displaced from and arranged equi-angularly around the center axis of said rotation shaft, wherein said rotation plates of said plate assembly are formed with additional cranked through bores having center axes, respectively, in parallel relationship to one another and to the center axis of said rotation shaft, the center axes of said additional cranked through bores being displaced from and arranged equi-angularly around the center axis of said rotation shaft, and said cranked shaft portions of said rotation shaft being rotatably received in said additional cranked through bores of said rotation plates, respectively.

* * * * *